United States Patent

[11] 3,588,200

| [72] | Inventor | John B. Thomson |
|---|---|---|
|  |  | Manhasset, N.Y. |
| [21] | Appl. No. | 762,726 |
| [22] | Filed | Sept. 26, 1968 |
| [45] | Patented | June 28, 1971 |
| [73] | Assignee | Thomson Industries, Inc. |
|  |  | Manhasset, N.Y. |

[54] SELF-ALIGNING MOUNT FOR LINEAR MOTION BALL BEARINGS
10 Claims, 9 Drawing Figs.

[52] U.S. Cl. .................................................. 308/6R
[51] Int. Cl. .................................................. F16c 29/06
[50] Field of Search .................................. 308/6
(Cursory), 6(B), 6(C), 72(Cursory), 308/72

[56] References Cited
UNITED STATES PATENTS

| 650,852 | 6/1900 | Metzger | 308/72 |
|---|---|---|---|
| 2,345,564 | 4/1944 | Allen | 308/72 |
| 2,827,340 | 3/1958 | Johnson | 308/72 |
| 3,482,890 | 12/1969 | Burrell | 308/72 |
| 2,628,135 | 2/1953 | Magee | 308/6 |
| 434,115 | 8/1890 | Norton | 308/36.1 |
| 1,510,806 | 10/1924 | Snider | 308/36.1 |
| 2,369,926 | 2/1945 | Thornhill | 308/6B |
| 2,423,684 | 7/1947 | Collito | 308/3.5 |
| 3,311,030 | 3/1967 | Halstead | 308/3.5X |
| 3,410,614 | 11/1968 | Shaw | 308/6C |
| 3,415,080 | 12/1968 | Swanson | 308/6X |

FOREIGN PATENTS

| 999,492 | 7/1965 | Great Britain | 308/6 |
|---|---|---|---|

OTHER REFERENCES
BALL BUSHINGS Catalog No. 4; Thomson Industries, Inc.; pp. 8, 9 and 11 (Recieved in Patent Office 10/14/1958)

Primary Examiner—Martin P. Schwadron
Assistant Examiner—Frank Susko
Attorney—Morgan, Finnegan, Durham and Pine ABSTRACT: The invention provides a self-aligning mount for a linear motion ball bearing, which in its preferred form provides diametral adjustment of the bearing diameter and flexible tubular members to fit snugly over both ends of the bearing to hold the bearing against axial and, in some cases, rotational movement in the base member of the mount, and which also provides a holding means for securing bearing seals at either end of the bearing.

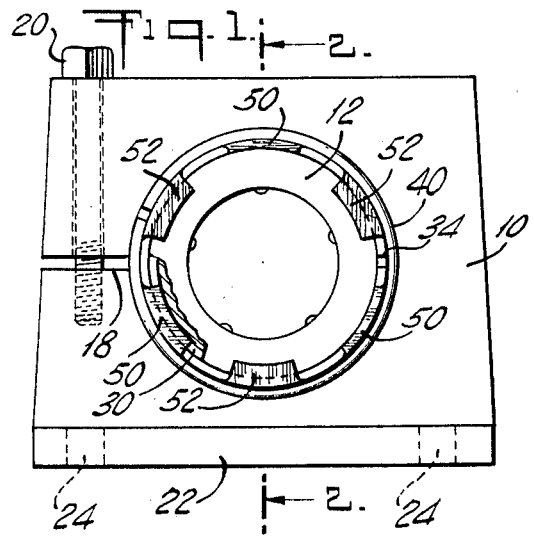

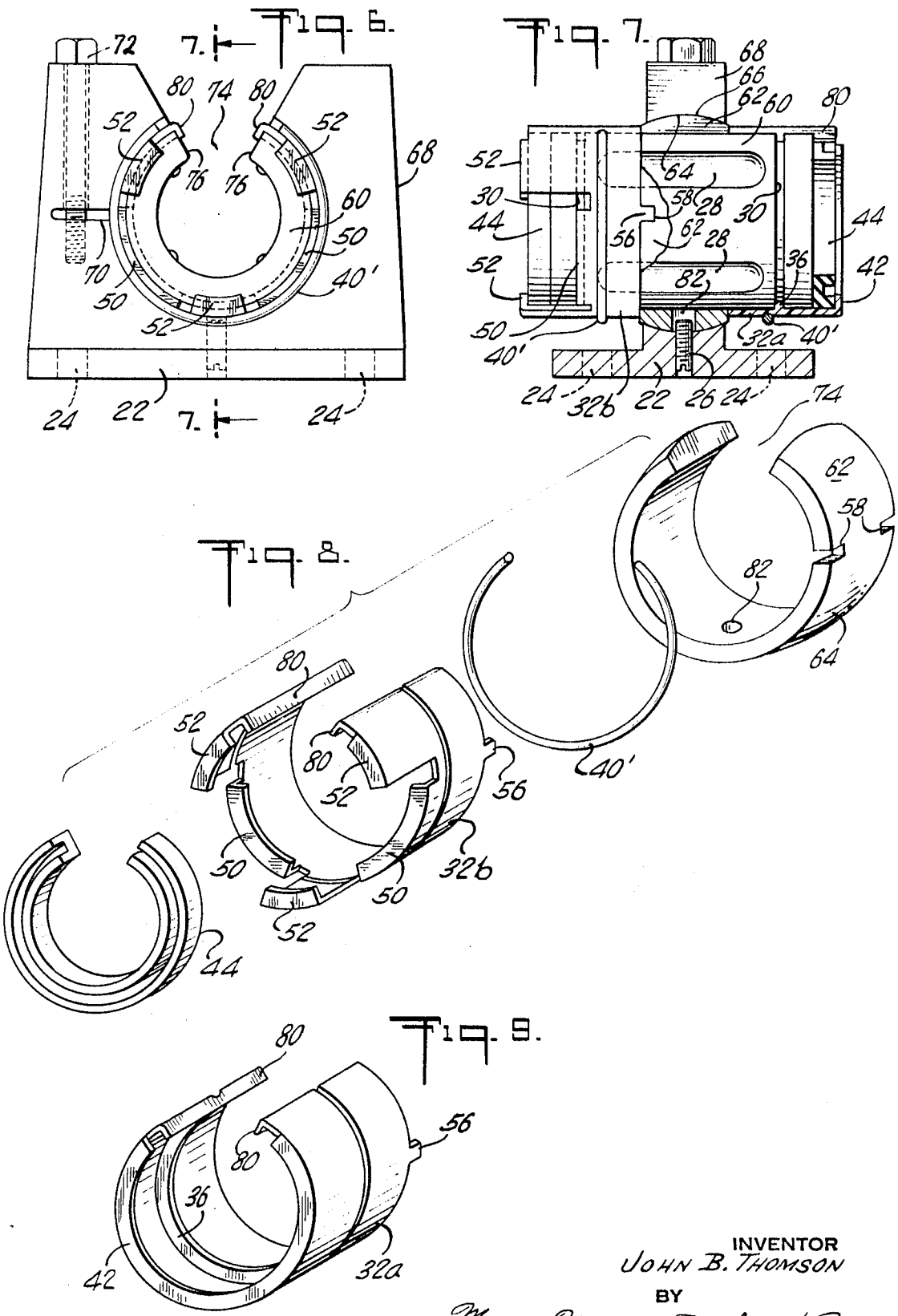

SELF-ALIGNING MOUNT FOR LINEAR MOTION BALL BEARINGS

BACKGROUND AND FIELD OF THE INVENTION

Linear motion ball bearings, such as those disclosed in the prior U.S. Pat. No. 2,628,135, to Magee, require accurate mounting to achieve their maximum usefulness in reducing friction of parts which have relative linear motion. This has usually been provided by precise machining. Also, bearing seals are frequently used with linear motion ball bearings but until now there has been no commercially available means either for holding the seals to the bearings, nor for a rigid self-aligning adjustable diameter mounting for the linear motion ball bearings.

SUMMARY OF THE INVENTION

The present invention provides a self-aligning adjustable diameter mounting for a linear motion ball bearing which provides for holding the bearing against axial movement and, when desired, against rotational movement with respect to its mounting, while providing for limited angular movement of the bearing and its supported shaft relative to each other. The mounting includes tubular members flexibly fitted to the bearings at both of its ends which also serve to engage and hold bearing seals at the same time that they prevent axial movement of the bearing in its mount. In a modification, the bearing and mounting provide for mounting of an open-type bearing which can roll along a shaft having laterally projecting support members.

BRIEF DESCRIPTION OF THE DRAWINGS

Of the drawings:

FIG. 1 is an end elevation of a bearing mount of the present invention;

FIG. 2 is a vertical longitudinal section taken on the line 2–2 of FIG. 1 with certain parts shown in side elevation;

FIG. 3 is an exploded perspective view of a form of a seal-holding member with a seal and retaining ring;

FIG. 4 is a vertical longitudinal section of a modified form of the bearing mount, with certain parts shown in side elevation;

FIG. 5 is a perspective view of a flexible, tubular, seal-holding member used in the form shown in FIG. 4;

FIG. 6 is an end elevation of a modified from of the invention;

FIG. 7 is a vertical longitudinal section of the mounting shown in FIG. 6 with certain parts shown in side elevation;

FIG. 8 is an exploded perspective view of a seal-holding member with its seal and retaining member as shown in FIGS. 6 and 7; and FIG. 9 is a perspective view of a modified flexible, tubular seal-holding member usable in the embodiment of FIGS. 6 and 7.

DESCRIPTION OF THE PREFERRED EMBODIMENTS

FIGS. 1, 2 and 3 illustrate a preferred embodiment of the invention, while FIGS. 4 and 5 illustrate a modification thereof.

As shown, there is provided an apertured metal block 10 which has an internal aperture to receive a linear motion ball bearing and intermediate means providing for angular movement between the bearing and the base member. As shown, the linear motion ball bearing 12 is the bearing of FIGS. 1 to 9 of the U.S. Pat. No. 2,628,135 to Magee.

About its middle, bearing 12 is surrounded by an annular ring 14 having a partispherical exterior which is seated in a complementary concave partispherical portion 16 of the block 10. At one side, block 10 is split, as at 18, and a capscrew 20 extends through one portion and is threaded into another portion so that the block may be tightened to engage and hold the ring 14. On one side block 10 is provided with laterally extending shoulder portions 22 which are provided with apertures 24 by which the block may be secured to a base member by suitable clamping screws. Obviously, for face mounting, the shoulder portions 22 could be eliminated and block 10 could be bolted flat to a wall or other flat surface.

Ring 14 is preferably split and clamp screw 20 is used to adjust the bore diameter of the linear ball bearing 12. If the ball bearing is split longitudinally, as described below in connection with FIG. 6, substantial bore adjustment is possible. If the linear ball bearing is not split longitudinally, bore adjustment can still be obtained by deflecting the outer sleeve of the linear ball bearing. Bore adjustment is highly desirable to eliminate play due to manufacturing tolerances on linear ball bearings and their mating shafts as well as obtaining preload zero clearance fits when desired.

To facilitate the self-aligning action of the split ring 14 during and after diameter adjustment, the ring can be made of low friction material or the mating surfaces coated to provide a low friction so that the diameter adjustment clamping action will not seriously impede the self-aligning action.

On its outer surface, bearing 12 is provided near both its ends with circumferential grooves 30.

Over both ends of the bearing 12 are fitted flexible tubular members which serve to prevent axial movement of the bearing 12 in the mounting block 10, and to hold seals at either end of the bearing.

FIGS. 3 and 5 show two different embodiments of the flexible tubular members, while FIG. 2 shows one modification fitted to the ends of the bearing and FIG. 4 shows another form fitted to the ends of the bearing 12.

As shown in FIGS. 4 and 5, the flexible tubular member 32 comprises a split cylindrical sleeve having an internal diameter conforming to the external diameter of the bearing 12, but provided with a split 34 so that the member may be easily mounted on the external sleeve of the bearing 12. Sleeve 32 has an internally projecting rib 36 spaced from one end so that it may be seated in groove 30, while the inner end of the member 32 is snug against ring 14, thereby holding the bearing 12 against axial movement in its mounting 10.

A resilient C-shaped or clamping ring 40 is provided on the exterior of each member 32 to assist in holding the member 32 in proper position with respect to the bearing 12, and with its inner end snug against the edge of ring 14.

Member 32 is also provided with an integral outwardly extending portion having an inturned lip 42 properly spaced to receive and hold a bearing seal ring 44 against relative axial movement.

FIG. 5 shows in detail a modified form of flexible tubular member adapted to secure a bearing seal in position. This modified form of seal-holding member is also shown in FIG. 4.

As embodied in FIGS. 2 and 3, the flexible tubular member 32' is formed with spaced fingers 46, 48 which extend outwardly for different distances and are provided with inturned radial lips 50, 52. The lips 50 are adapted to engage in the groove 30 to hold the bearing against axial displacement, while the lips 52 engage and hold the bearing seal member 44 snugly against the end of the bearing 12.

The flexible tubular members 32 and 32' are preferably formed by injection molding of a plastic material or by metal stamping. In the case of the embodiment shown in FIG. 3, if a bearing seal is not to be mounted adjacent the end of the bearing the longer fingers 48 may be broken or cut away along groove 49 to eliminate the excess length of the assembly.

FIGS. 6 to 9 illustrate further modifications of the invention to provide a mounting for an open-type bearing as disclosed by reference to FIG. 10 of the Magee U.S. Pat. No. 2,628,135.

The open-type linear motion ball bearing 60 is surrounded midway by a ring 62 having a partispherical external surface 64 seated in a correspondingly concave partispherical cavity 66 formed in the supporting member 68 fitting snugly about the exterior cylindrical surface of the bearing 60.

Ring 62 is seated in a partispherical concave surface 66 formed as part of the circular opening in block 68. Block 68 has a gap 70 which may be tightened or relieved by capscrew 72. This permits relatively precise adjustment of the diameter of bearing 60.

Ring 62 is formed with a gap 74 which approximates the gap 76 in the bearing 60, which permits the bearing and mount to pass by a shaft support.

The ends of the bearing 60 are fitted with external sleeves 32a or 32b similar to those shown in FIGS. 2 to 5 as 32 and 32' respectively except that those in FIGS. 6 to 9 are provided with a gap to correspond with the bearing gap 76 and are provided with inturned lips 80 at the gap so as to hold the sleeve and bearing against relative rotation. An alternate to the engagement of the tab 56 with slot 58 is to stake or otherwise provide inward protrusions from the edges of the gap 74 in ring 62 to engage the edges of the opening in the linear ball bearing 60 to prevent its rotation.

As shown in FIGS. 7 and 8, the ring 62 is provided with a relatively large hole 82 to receive the end of screw 26 thereby to hold the ring and bearing against rotation.

The invention in its broader aspects is not limited to the specific mechanisms shown and described but departures may be made therefrom within the scope of the accompanying claims without departing from the principles of the invention and without sacrificing its chief advantages.

I claim:

1. A self-aligning mount for a linear motion ball bearing having a longitudinally extending housing comprising a base member, means mounted on said base member and movable angularly relative to said base member for receiving said longitudinally extending housing; means for preventing axial movement of said angularly movable mounting means relative to said base member, and tubular members mounted on the ends of said longitudinally extending housing at the opposite sides of said angularly movable mounting means, said tubular members engaging the opposite sides of said angularly movable mounting means for preventing axial movement of said longitudinally extending housing relative to said base member, said longitudinally extending housing having recesses in its outer surface and said tubular members having protrusions engaging in said recesses and when so engaged locking said tubular members from axial motion relative to said longitudinally extending housing.

2. The bearing mount of claim 1 in which said tubular members extend beyond the ends of said longitudinally extending housing and include inwardly turned portions and holding a bearing seal.

3. The bearing mount of claim 1 in which base member, housing and said angularly movable mounting means include axially extending gaps through which a shaft supporting member may pass.

4. A bearing mount as claimed in claim 1 in which means are provided for preventing rotation of said angularly movable mounting means relative to said base member and means are provided for preventing rotation of said longitudinally extending housing and said tubular members relative to said angularly movable mounting means.

5. The bearing mount of claim 4 in which a resilient compression ring surrounds each of said tubular members for holding said protrusions in engagement with said recesses.

6. The bearing mount of claim 1 in which said angularly movable mounting means comprises a split ring having a partispherical exterior surface and said base member has a mating partispherical surface.

7. The bearing mount of claim 6 in which said angularly movable mounting means is provided with a low friction surface.

8. The bearing mount of claim 1 in which said base member has an opening with a partispherical internal surface in which is seated a split ring having a mating partispherical surface, means in said base member for varying the internal diameter of said split ring whereby the internal diameter of a bearing within said split ring may be varied.

9. The bearing mount of claim 8 in which the bearing has a closed outer sleeve which may be deflected by said split ring.

10. The bearing mount of claim 1 in which said tubular members are flexible facilitating installation and removal.